United States Patent
Aaron et al.

(10) Patent No.: US 6,929,207 B2
(45) Date of Patent: Aug. 16, 2005

(54) TAPE CARTRIDGE

(75) Inventors: Robert Christopher Aaron, Boise, ID (US); Stephen V. Deckers, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/699,721

(22) Filed: Nov. 3, 2003

(65) Prior Publication Data

US 2005/0092859 A1 May 5, 2005

(51) Int. Cl.$^7$ .............................................. G11B 23/04
(52) U.S. Cl. ................. 242/338.1; 242/343; 242/345.2; 360/132
(58) Field of Search ............................... 242/338, 338.1, 242/343, 343.1, 343.2, 348; 360/132

(56) References Cited

U.S. PATENT DOCUMENTS

| | | | | |
|---|---|---|---|---|
| 5,901,916 A | * | 5/1999 | McAllister et al. | 242/348 |
| 6,264,126 B1 | * | 7/2001 | Shima et al. | 242/343 |
| 6,452,747 B1 | * | 9/2002 | Johnson et al. | 360/132 |
| 6,452,748 B1 | * | 9/2002 | Shima et al. | 360/132 |
| 6,480,357 B1 | * | 11/2002 | Rambosek | 360/132 |
| 6,650,504 B2 | * | 11/2003 | Ridl | 360/132 |
| 6,745,968 B1 | * | 6/2004 | Schoettle et al. | 242/338.1 |
| 6,751,059 B2 | * | 6/2004 | Morita et al. | 360/132 |
| 2002/0166913 A1 | | 11/2002 | Ridl et al. | |

FOREIGN PATENT DOCUMENTS

| | | |
|---|---|---|
| EP | 1204114 A1 | 8/2002 |
| EP | 1271517 A1 | 2/2003 |
| GB | 2334945 | 8/1999 |

* cited by examiner

*Primary Examiner*—William A. Rivera

(57) ABSTRACT

In one embodiment, a tape cartridge includes: a housing; a reel rotatably disposed in the housing; a reel lock operatively coupled to the reel, the reel lock operative between a first position in which the reel is locked and a second position in which the reel is unlocked; one of the housing or the reel lock having an insert and the other of the housing or the reel lock having a receiver, the insert sized and shaped to fit closely into the receiver and the insert slidable in the receiver; and a damper operatively coupled between the housing and the reel lock when the reel lock is in the second position.

20 Claims, 8 Drawing Sheets

TAPE CARTRIDGE

BACKGROUND

A widely used medium for storing data is magnetic tape. Tape cartridges are one of the most popular formats for storing data on tape. Two widely used tape cartridges are the dual reel cartridge and the single supply reel cartridge. In a dual reel tape cartridge, both the supply reel and the take-up reel are housed in the cartridge. In a single supply reel tape cartridge, the take-up reel is built into the tape drive along with an automatic tape threading mechanism. When a tape cartridge is not in use in a tape drive or tape player, it is possible for the reel(s) to rotate idly and cause the tape to lose tension and become partially unwound from the reel. To avoid this problem, tape cartridges often include some type of reel lock.

A common type of reel lock used in single supply reel cartridges includes a locking gear that engages teeth or other projections on the back of a reel drive gear that locks the reel when the cartridge is not installed in a tape drive. A spider washer pushes the locking gear out of the way into a disengaged position unlocking the reel when the cartridge is installed in the tape drive. In this disengaged position, the spider washer spins (with the reel) against the stationary locking gear. The spinning washer sometimes makes the locking gear wobble, oscillate up and down or otherwise vibrate within the free play tolerance of the alignment feature that couples the locking gear to the cartridge housing. At the higher tape speeds of some of the newer generation tape drives, the reel lock vibrating against the hard plastic cartridge housing can be noisy. Embodiments of the invention were developed to reduce these noisy vibrations.

DESCRIPTION

Figure 1:
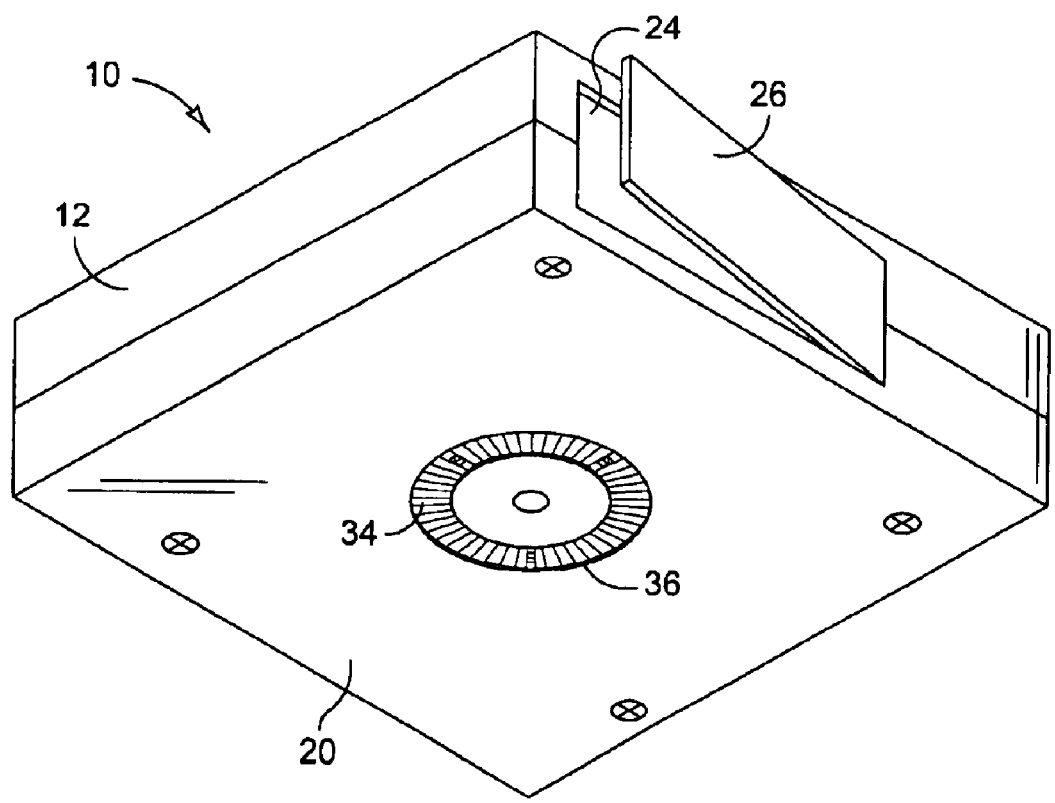
FIG. 1 is a perspective bottom side view of a single supply reel tape cartridge.
Figure 2:
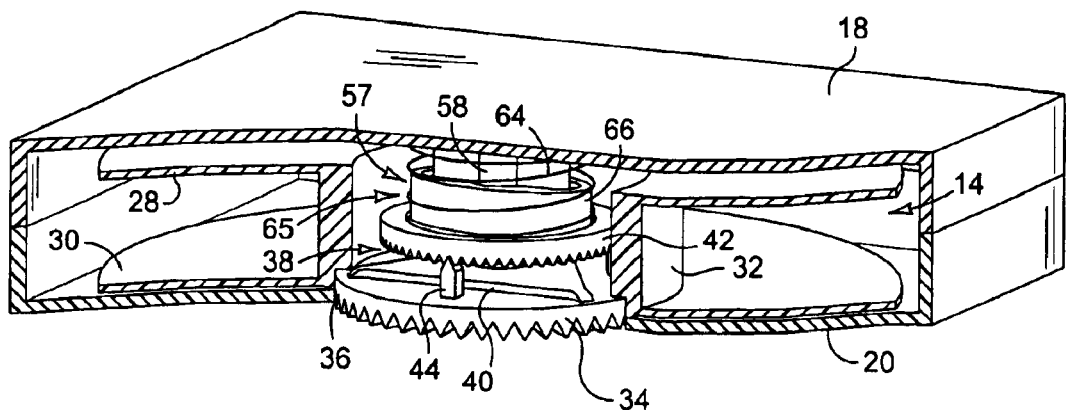
FIGS. 2 and 3 are cross section perspective views of a single supply reel tape cartridge constructed according to one embodiment of the invention showing the reel lock in the locked and unlocked positions, respectively.
Figure 3:
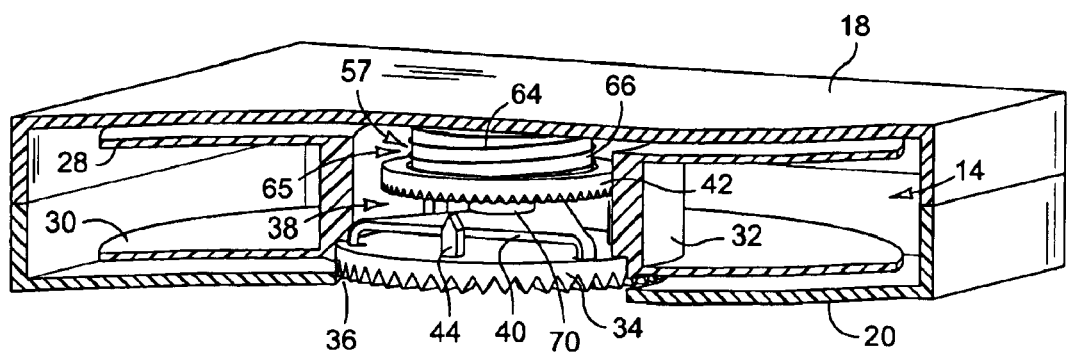
Figure 4:
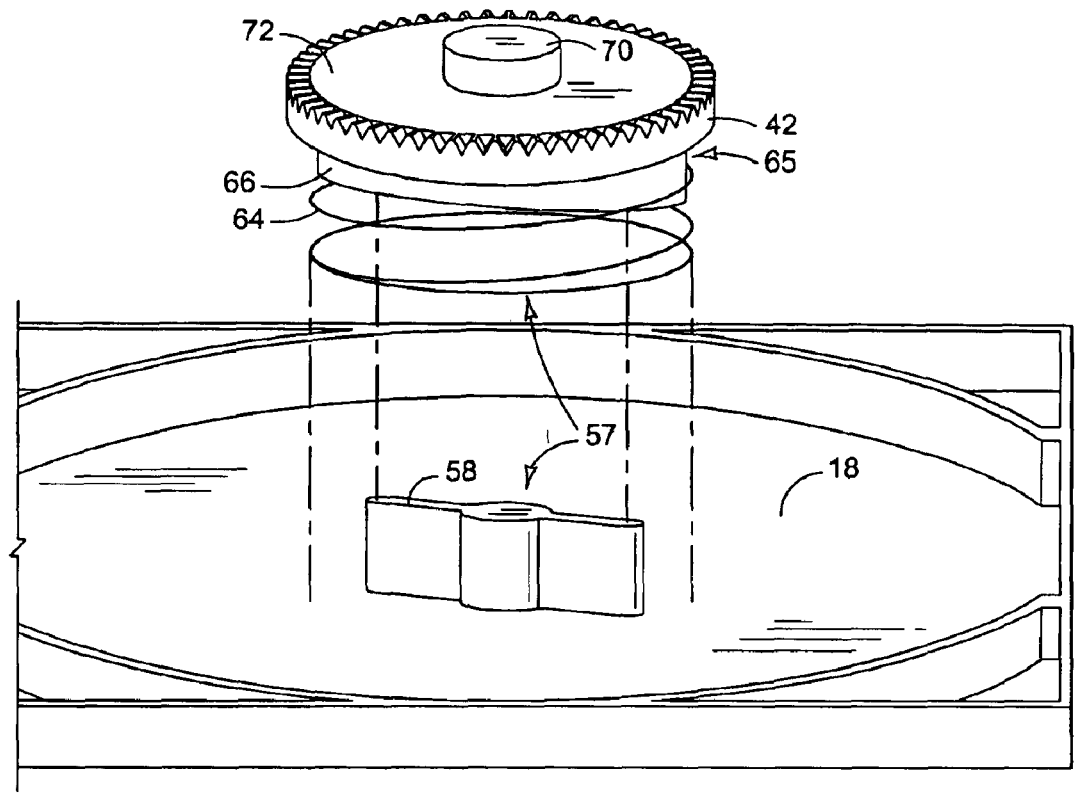
FIG. 4 is a perspective view of the inside of the top of the housing of the cartridge shown in FIGS. 2 and 3.
Figure 5:
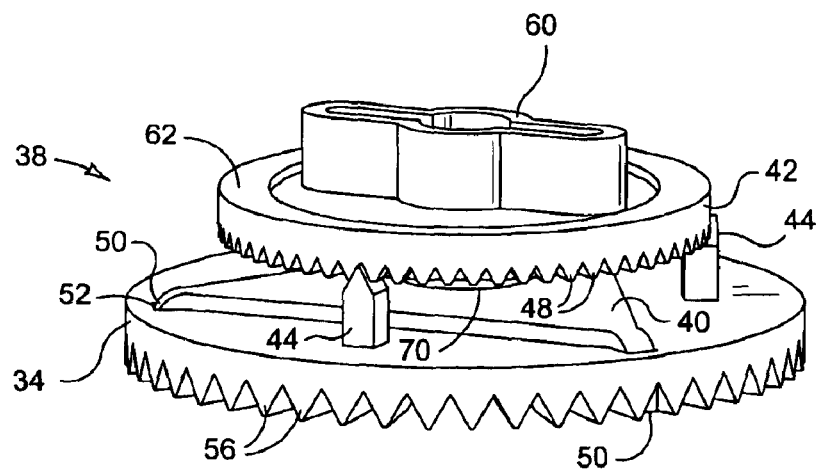
FIG. 5 is a top perspective view of reel lock components of the cartridge shown in FIGS. 2 and 3.

Referring to FIGS. 1–3, a single reel tape cartridge 10 includes a housing 12 and a tape supply reel 14. Housing 12 is a rectangular box-like structure configured to enclose a single reel of tape. Housing 12 is usually formed of plastic molded into two segments—a cover segment 18 and a base segment 20. The tape is accessible to a tape drive through an access window 24. A door 26 covers access window 24 when cartridge 10 is not installed in a tape drive.

Referring to FIGS. 2 and 3, tape reel 14 includes disc shaped top and bottom flanges 28 and 30 and an annular hub 32. A circular reel gear 34 is positioned at the bottom of hub 32. Reel gear 34 is the operative interface between a tape drive and the tape reel. Reel gear 34 is engaged by a mating coaxial gear in the drive mechanism of a tape drive. Reel gear 34 is accessed by the tape drive through an opening 36 in the base 20 of housing 12.

Referring now to FIGS. 2–8, reel lock 38 includes a spider washer 40, a locking gear 42 and locking posts 44 positioned at spaced apart locations around the top of reel gear 34. The ends 46 of locking posts 44 are sized and shaped to fit into locking gear teeth 48. Three locking posts 44 spaced at equal intervals around reel gear 34 are just one example of a suitable structure for the operative engagement between locking gear 42 and reel gear 34. Other examples include a full or partial set of gear teeth on the top of reel gear 34 instead of the posts used in the embodiment shown in FIGS. 2–8 or, instead of using a locking gear 42, this locking member could be constructed as a flat disk having one or more posts projecting down to engage teeth on top of the reel gear.

Figure 6:
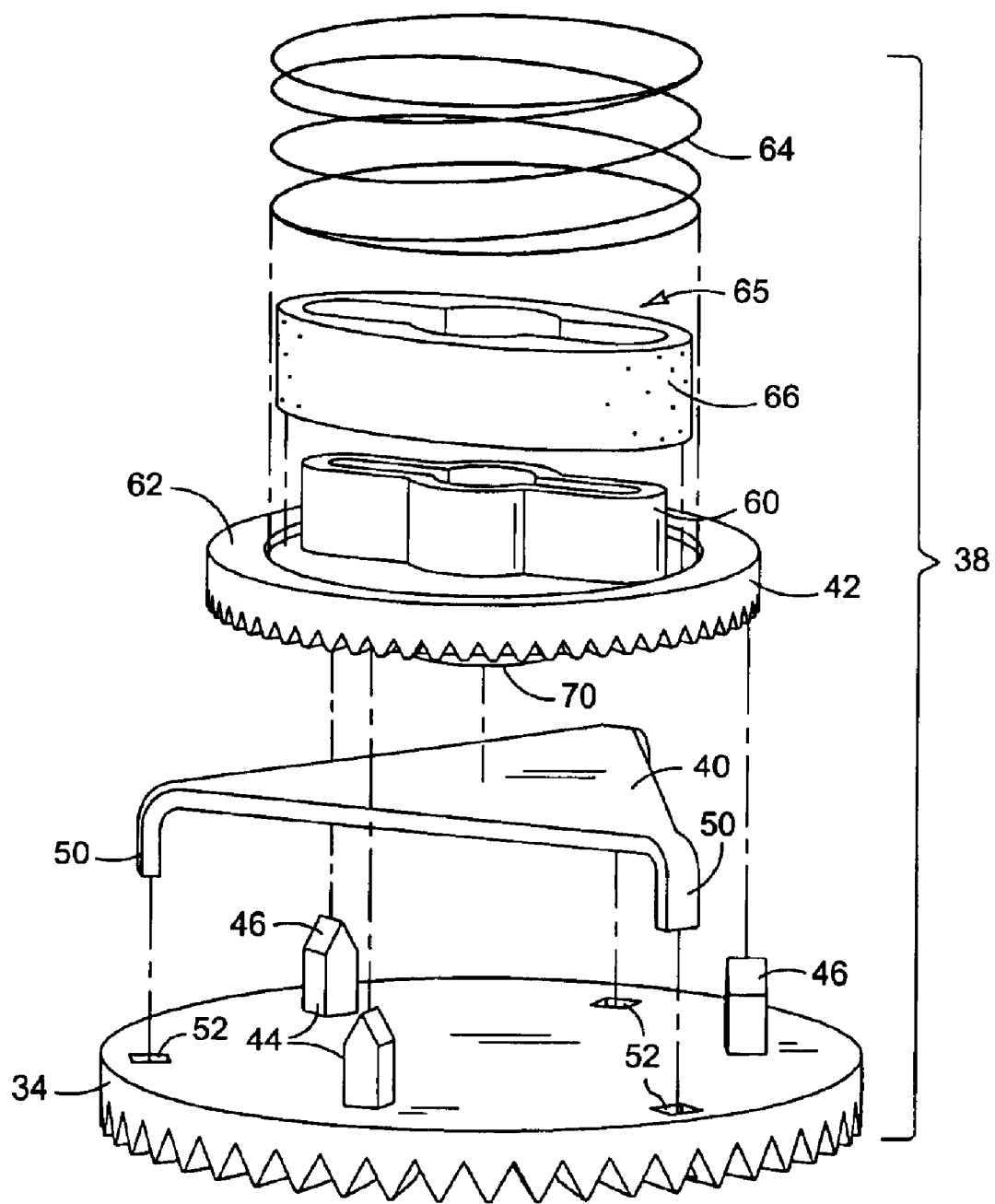
FIG. 6 is an exploded perspective view of the components shown in FIG. 4.
Figure 7:
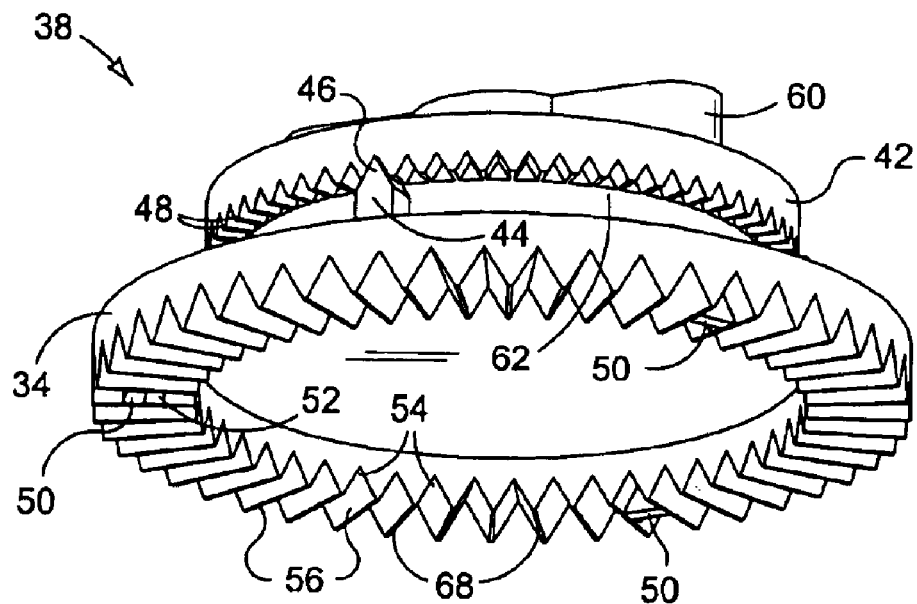
FIGS. 7 and 8 are perspective views of reel lock components of the cartridge shown in FIGS. 2 and 3 showing the legs of the spider washer in the locked and unlocked position, respectively.
Figure 8:
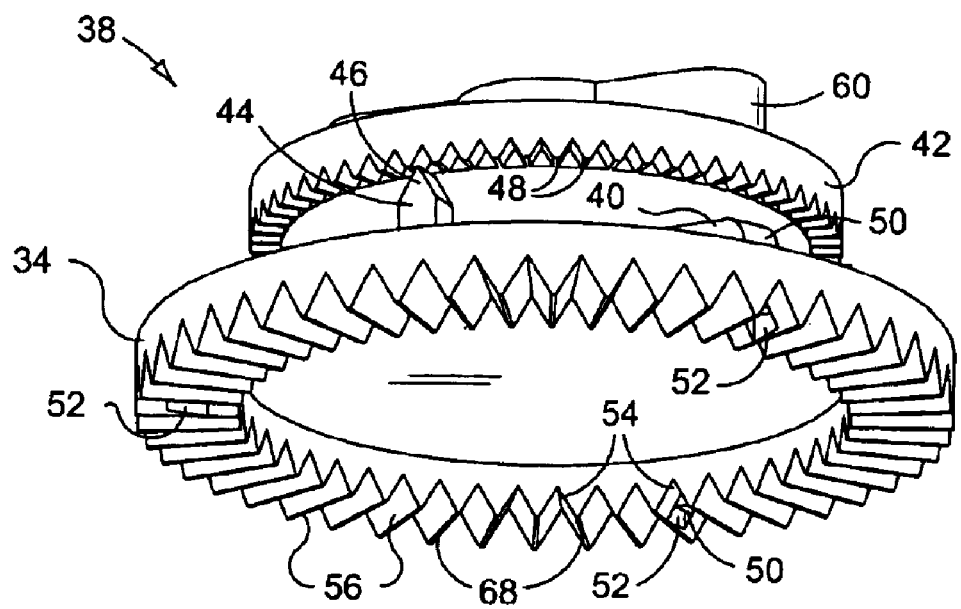

Legs 50 of spider washer 40 project through holes 52 in reel gear 34. Holes 52 are positioned at the gaps 54 between reel gear teeth 56 as best seen in FIGS. 6–8. Spider legs 50 project into gaps 54 between reel gear teeth 56, as best seen in FIG. 7. Preferably, each hole 52 and correspondingly each spider leg 50 spans the gap 54 between adjacent gear teeth to prevent jamming in the teeth of the tape drive gear. Each hole 52 and spider leg 50 could also be made to span two or more gaps 54, in which case hole 52 would extend through one or more gear teeth.

Locking gear 42 is movable in only one dimension, along the axis of rotation of reel 14. Locking gear 42 is nominally fixed in the other dimensions by an alignment feature 57 that couples gear 42 to cartridge housing 12. In the embodiment shown in FIGS. 2–8, alignment feature 57 includes an insert 58 formed on or integral with cover segment 18 of housing 12 and a mating receiver 60 formed on or integral with the top 62 of locking gear 42. In this embodiment, insert 58 is constructed as a ridge on housing cover 18. Receiver 60 on locking gear 42 receives ridge 58 on cartridge housing 12 to align locking gear 42 over spider washer 40 and locking posts 44. A biasing spring 64 between cartridge housing 12 and locking gear 42 urges locking gear 42 against spider washer 40 and locking posts 44. This biasing mechanism 64 pushes spider legs 50 down into reel gear teeth 56 and keeps reel lock 38 locked when tape cartridge 10 is not installed in a tape drive. A damper 65 is interposed between locking gear 42 and housing 12. In the embodiment shown in FIGS. 2–8, damper 65 is constructed as a resilient pad 66 surrounding slot 60 on locking gear 42. Resilient pad 66 is slightly deeper than receiver 60 so that pad 66 protrudes above receiver 60.

In operation, as the drive motor gear in a tape drive engages reel gear 34, the tips of the drive motor gear push on spider legs 50 to drive spider washer 40 up into reel gear 34. This action moves locking gear 42 up and off locking posts 44 to unlock reel lock 38, as best seen by comparing FIGS. 2 and 3 and FIGS. 7 and 8. Spider washer 40 and biasing spring 64 serve as the actuator for reel lock 38. Spider washer 40 acts as a release mechanism to disengage the locking member, locking gear 42 in this embodiment, from reel 14 and unlock reel lock 38 when the tape drive engages the reel 14. Spring 64 serves as a biasing mechanism to urge the locking member, locking gear 54, towards the locked position. When locking gear 42 is pushed up to the unlocked position, shown in FIGS. 3 and 8, resilient pad 66 is driven into contact with housing 12 at the area surrounding ridge 58 as ridge 58 slides deeper into receiver 60. Thus, while reel lock 38 is in the unlocked position, resilient pad 66 is pressed between locking gear 62 and housing 12 to dampen any vibration in locking gear 62 and insulate housing 12 against any such vibration.

It is desirable that spider legs 50 project out flush with the tips 68 of reel gear teeth 56 to maximize the vertical travel of locking gear 42 when reel gear 34 is engaged by the tape drive. The depth of locking gear teeth 48 should be slightly less than the depth of reel gear teeth 56 (or less than the distance spider legs 50 project into gaps 54 in reel gear teeth 56 if less than the full depth of the teeth) to ensure locking gear 42 clears locking posts 44 to fully release the lock 50. Forces are transmitted between locking gear 42 and spider washer 40 through a button 70 on the bottom 72 of locking gear 42. The frictional interface/bearing surface between spider washer 40 (which rotates with tape reel 14) and locking gear 42 (which is rotationally fixed to cartridge housing 12) occurs at button 70. The frictional interface at button 70 is at the center of rotation of the reel so the radius of button 70 can be made relatively small to minimize frictional drag and wear.

Figure 9:
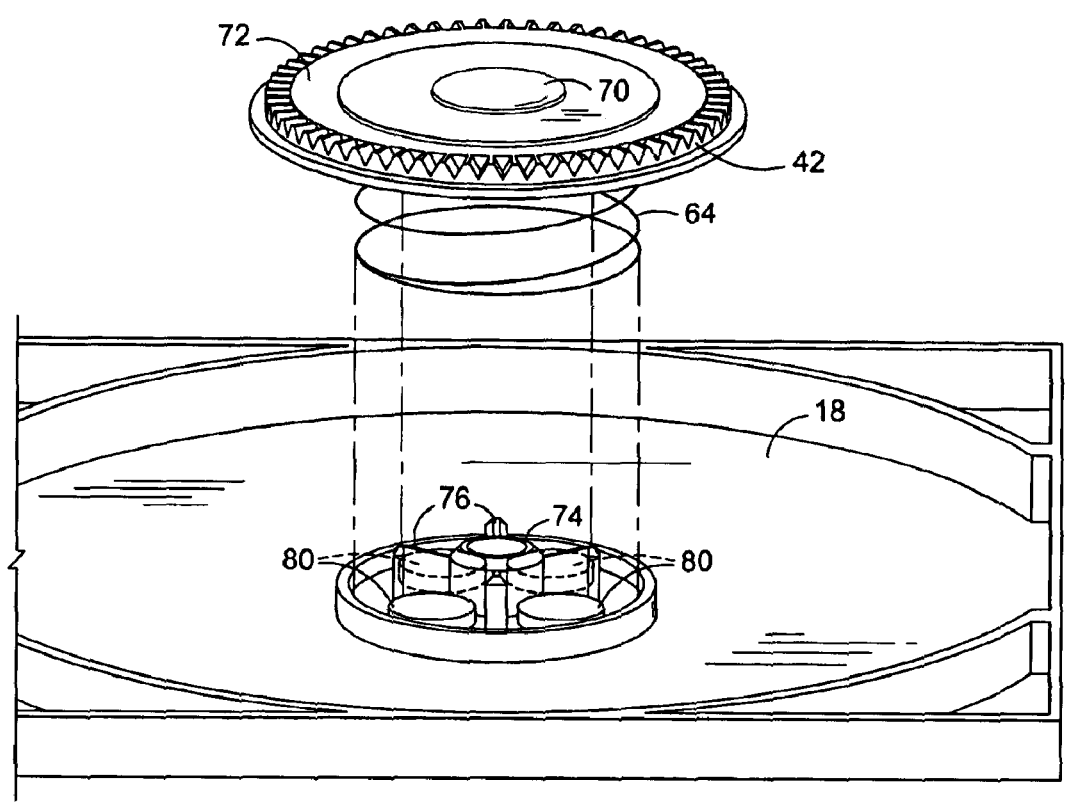
FIGS. 9 and 10 are perspective views showing reel lock and motion damping components of a tape cartridge constructed according to a second embodiment of the invention.
Figure 10:
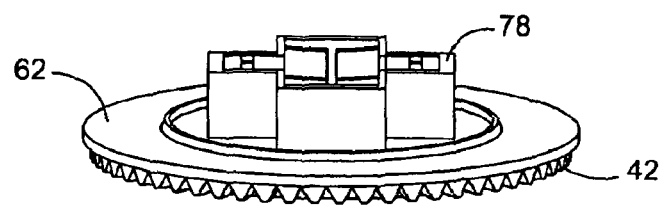

FIGS. 9–10 and 11–12 illustrate alternative configurations for alignment feature 57 and the associated damper 65. Referring first to FIGS. 9 and 10, the alignment feature includes a hub 74 and a projecting insert 76 on cover segment 18 of housing 12 and a mating receiver 78 on top 62 of locking gear 42. In this embodiment, insert 76 is constructed as raised spokes on housing cover 18 and the damper is constructed as disc shaped resilient pads 80 affixed to housing 12 between spokes 76. When locking gear 42 is pushed up to the unlocked position, receiver 78 is driven into contact with pads 80 as spokes 76 slide deeper into receiver 80. Thus, while reel lock 38 is in the unlocked position, resilient pads 80 are pressed between locking gear 42 and housing 12 to dampen any vibration in locking gear 62 and insulate housing 12 against any such vibration.

Figure 11:
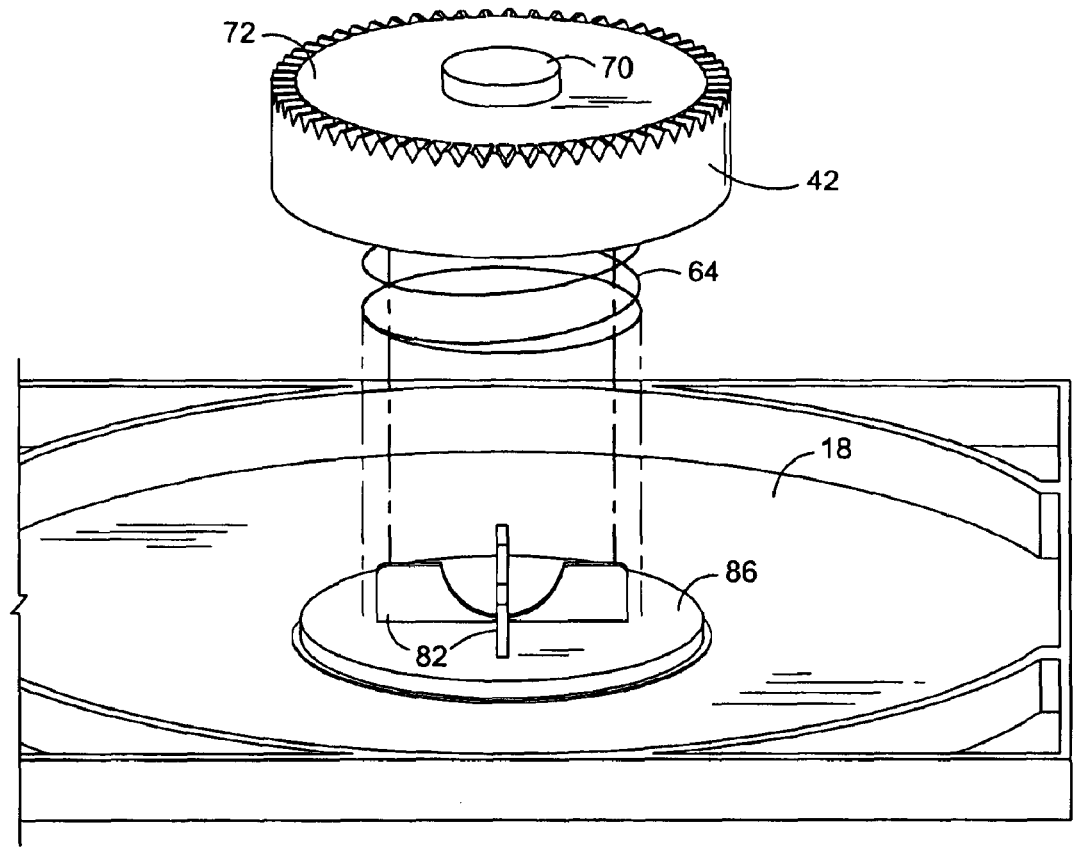
FIGS. 11 and 12 are perspective views showing reel lock and motion damping components of a tape cartridge constructed according to a third embodiment of the invention.
Figure 12:
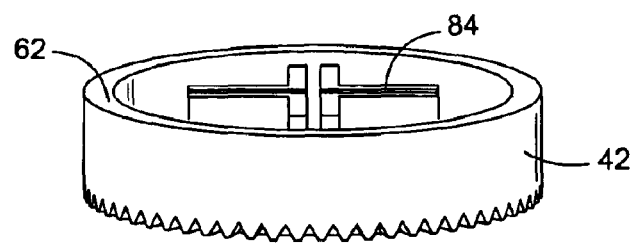
Figure 13:
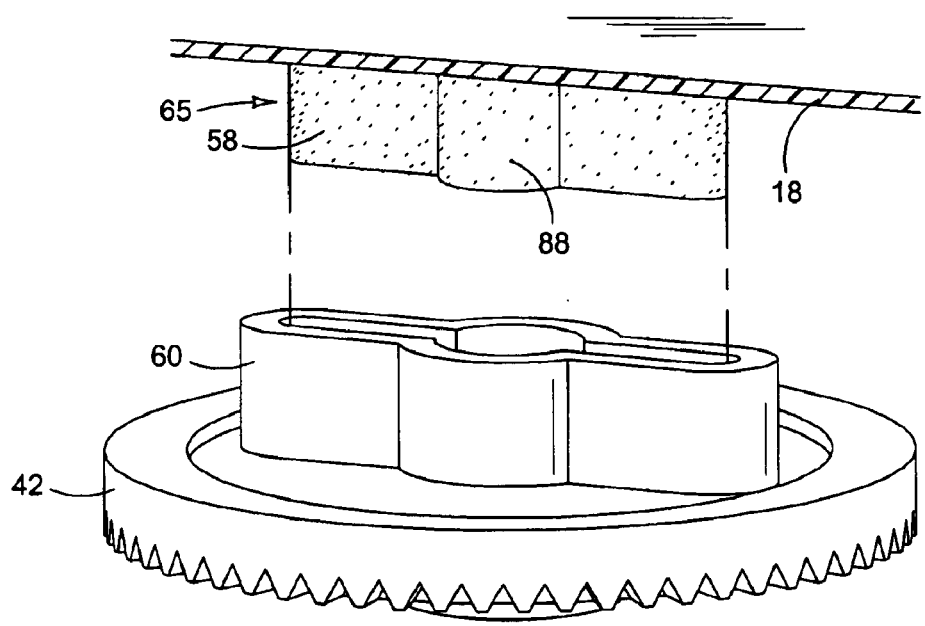
FIGS. 13 and 14 are perspective and section views, respectively, showing reel lock and motion damping components of a tape cartridge constructed according to a fourth embodiment of the invention.
Figure 14:
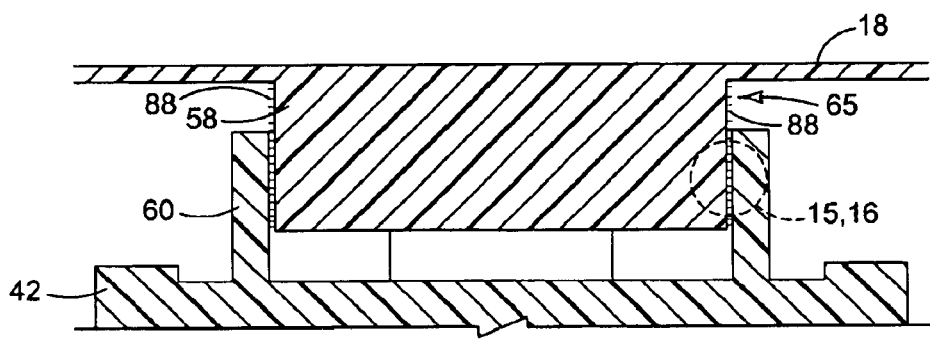
Figures 15, 16:
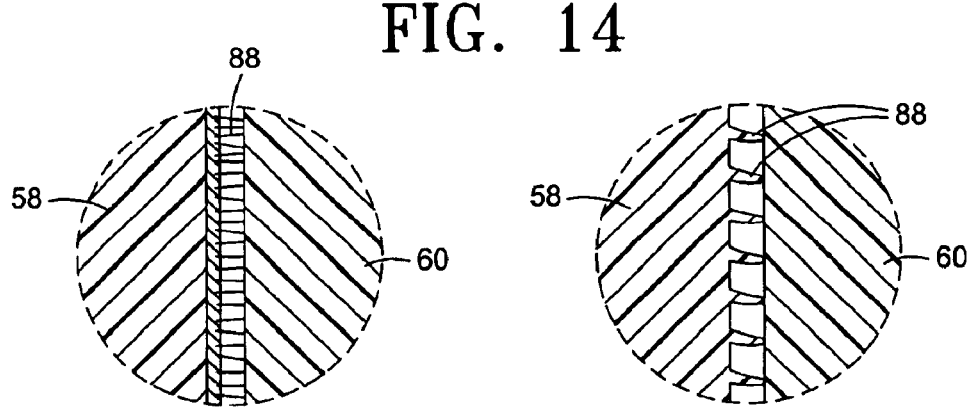
FIG. 15 is a detail view of one embodiment of a damper portion of the components shown in FIGS. 13 and 14.
FIG. 16 is a detail view of another embodiment of a damper portion of the components shown in FIGS. 13 and 14.

Referring to FIGS. 11 and 12, the alignment feature includes insert 82 on cover segment 18 of housing 12 and a mating receiver 84 on top 62 of locking gear 42. In this embodiment, insert 82 is constructed as intersecting ridges on housing cover 18 and the damper is constructed as a disc shaped resilient pad 86 affixed to housing 12 surrounding ridges 82. When locking gear 42 is pushed up to the unlocked position, receiver 84 is driven into contact with pad 86 as ridges 82 move deeper into receiver 84. Thus, while reel lock 38 is in the unlocked position, resilient pad 86 is pressed between locking gear 42 and housing 12 to dampen any vibration in locking gear 62 and insulates housing 12 against any such vibration.

Referring to FIGS. 13–16, alignment feature 57 includes the ridge type insert 58 and mating receiver 60 of FIGS. 2–8, but damper 65 consists of a resilient pad 88 affixed to or integral with the outside of ridge 58. In one embodiment, shown in the detail view of FIG. 15, resilient pad 88 is formed from a bristling material lining the outside of ridge 58. In another embodiment, shown in the detail view of FIG. 16, resilient pad 88 is formed as a multitude of tiny fingers molded along the outside of ridge 58. In these embodiments, pad 88 creates a light resilient interference fit between ridge 58 and receiver 60 to dampen any vibration in locking gear 62 and insulate housing 12 against any such vibration.

Although it is expected that resilient pads 66, 80 and 86 will typically be formed from rubber or another suitable elastomeric material, any resilient material that provides the necessary or desired damping may be used. "Teeth" means any sharp angled, rounded or other combination of protrusions and indentations.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A tape cartridge, comprising:
   a housing;
   a reel rotatably disposed in the housing;
   a reel lock operative between a first position in which the reel is locked and a second position in which the reel is unlocked;
   one of the housing or the reel lock having an insert and the other of the housing or the reel lock having a receiver, the insert sized and shaped to fit closely into the receiver and the insert slidable in the receiver; and
   a resilient pad pressed between the housing and the reel lock when the reel lock is in the second position.

2. The tape cartridge of claim 1, wherein the pad is affixed to or integral with the housing.

3. The tape cartridge of claim 1, wherein the pad is affixed to or integral with the reel lock.

4. The tape cartridge of claim 1, wherein the pad is pressed between the housing and the reel lock when the reel lock is in the first position, and the pad is pressed between the housing and the reel lock when the reel lock is in the second position.

5. The tape cartridge of claim 1, wherein the resilient pad comprises an elastomeric pad.

6. The tape cartridge of claim 1, wherein the resilient pad is affixed to or integral with the housing.

7. The tape cartridge of claim 1, wherein the resilient pad is affixed to or integral with the reel lock.

8. The tape cartridge of claim 1, wherein the resilient pad is affixed to or integral with the insert.

9. The tape cartridge of claim 1, wherein the resilient pad is affixed to or integral with the receiver.

10. A tape cartridge, comprising:
    a housing;
    a reel rotatably disposed in the housing;
    a tape drive interface on the reel, the tape drive interface accessible through the housing and configured to drivingly couple the reel to a tape drive;
    a rotatably fixed locking member movable between a locked position in which the locking member engages the reel to prevent rotation of the reel and an unlocked position in which the locking member does not engage the reel and the reel is free to rotate; and
    a resilient pad pressed between the housing and the locking member when the locking member is in the unlocked position.

11. The tape cartridge of claim 10, further comprising an actuator operative to engage the locking member, the actuator including a release mechanism engagable by the tape drive at the tape drive interface, the release mechanism movable between a first position in which the release mechanism is not engaged by the tape drive and the locking member is locked and a second position in which the tape drive engages the release mechanism and the locking member is unlocked.

12. The tape cartridge of claim 11, wherein the actuator further comprises a biasing mechanism urging the locking member towards the locked position.

13. A tape cartridge, comprising:
a housing;
a reel rotatably disposed in the housing;
a first gear operatively coupled to the reel;
a second gear rotationally fixed to the housing, the second gear having a front part facing the first gear and a back part opposite the front part, the second gear movable between
a first position in which teeth on the front part of the second gear engage the first gear and the second part of the second gear is spaced apart from the housing, and
a second position in which the first part of the second gear is spaced apart from the first gear and the second part of the second gear resiliently contacts the housing; and
a resilient pad between the second part of the second gear and the housing.

14. The tape cartridge of claim 13, further comprising holes through the first gear, the holes positioned near a periphery of the first gear, and a washer operatively coupled to the first gear, the washer interposed between the first gear and the second gear and the washer having legs projecting into the holes in the first gear.

15. A tape cartridge, comprising:
a housing;
a reel rotatably disposed in the housing, the reel having an annular hub around a center of rotation of the reel and spaced apart parallel flanges extending out from the hub;
a first gear on the bottom of the reel, the first gear having gear teeth on a bottom side, locking projections projecting from a top side, and holes therethrough positioned at the location of gaps between first gear teeth;
a second gear rotationally fixed to the housing, the second gear having second gear teeth engagable with the projections on the first gear;
a washer interposed between the first gear and the second gear, the washer having legs projecting into the holes in the first gear and the washer bearing on the second gear at the center of rotation of the reel;
the second gear movable between a locked position in which the second gear engages the projections to prevent rotation of the reel and an unlocked position in which the second gear does not engage the projections and the reel is free to rotate;
the washer movable between a first position in which the legs of the spider washer extend down into gaps between first gear teeth and the second gear is in the locked position and a second position in which the legs of the washer do not extend down into gaps between first gear teeth and the second gear is in the unlocked position;
a vibration damper interposed between the second gear and the; and wherein the housing includes a projecting insert slidable in a receiver on the second gear and the vibration damper comprises a resilient pad affixed to the housing or the second gear, the resilient pad being pressed between the receiver and the housing when the second gear is in the unlocked position.

16. A tape cartridge, comprising:
a housing;
a reel rotatably disposed in the housing;
a locking means bearing on the housing for preventing the reel from rotating;
a resilient pad interposed between the locking means and the housing for damping vibration in the locking means.

17. A tape cartridge, comprising:
a housing;
a reel rotatably disposed in the housing;
a reel lock operative between a first position in which the reel is locked and a second position in which the reel is unlocked;
one of the housing or the reel lock having an insert and the other of the housing or the reel lock having a receiver, the insert sized and shaped to fit closely into the receiver and the insert slidable in the receiver;
a biasing mechanism urging the reel lock towards the locked position; and
a damper discrete from the biasing mechanism, the damper operatively coupled between the housing and the reel lock when the reel lock is in the second position.

18. The tape cartridge of claim 17, wherein the damper comprises a resilient pad pressed between the housing and the reel lock when the reel lock is in the second position.

19. A tape cartridge, comprising:
a housing;
a reel rotatably disposed in the housing;
a tape drive interface on the reel, the tape drive interface accessible through the housing and configured to drivingly couple the reel to a tape drive;
a rotatably fixed locking member movable between a locked position in which the locking member engages the reel to prevent rotation of the reel and an unlocked position in which the locking member does not engage the reel and the reel is free to rotate;
an actuator operative to engage the locking member, the actuator including
a release mechanism engagable by the tape drive at the tape drive interface, the release mechanism movable between a first position in which the release mechanism is not engaged by the tape drive and the locking member is locked and a second position in which the tape drive engages the release mechanism and the locking member is unlocked; and
a biasing mechanism urging the locking member towards the locked position; and
a damper discrete from the biasing mechanism, the damper operatively coupled between the housing and the locking member when the locking member is in the unlocked position.

20. The tape cartridge of claim 19, wherein the damper comprises a resilient pad pressed between the housing and the locking member when the locking member is in the unlocked position.

* * * * *

UNITED STATES PATENT AND TRADEMARK OFFICE
CERTIFICATE OF CORRECTION

PATENT NO. : 6,929,207 B2 Page 1 of 1
APPLICATION NO. : 10/699721
DATED : August 16, 2005
INVENTOR(S) : Robert Christopher Aaron et al.

It is certified that error appears in the above-identified patent and that said Letters Patent is hereby corrected as shown below:

In column 5, line 67, in Claim 15, after "the" insert -- housing --.

Signed and Sealed this

Sixth Day of July, 2010

David J. Kappos
*Director of the United States Patent and Trademark Office*